(12) United States Patent
Willmann et al.

(10) Patent No.: US 8,072,728 B2
(45) Date of Patent: Dec. 6, 2011

(54) OVERVOLTAGE PROTECTION DEVICE

(75) Inventors: Jens Willmann, Buende (DE); Gerhard Wolff, Extertal (DE); Martin Wetter, Detmold (DE); Frank Welzel, Detmold (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 392 days.

(21) Appl. No.: 12/474,358

(22) Filed: May 29, 2009

(65) Prior Publication Data
US 2009/0296297 A1 Dec. 3, 2009

(30) Foreign Application Priority Data
May 29, 2008 (DE) .......................... 10 2008 025 936

(51) Int. Cl.
*H02H 1/04* (2006.01)
(52) U.S. Cl. ........................ 361/119; 361/117
(58) Field of Classification Search ........... 361/117–119
See application file for complete search history.

(56) References Cited

U.S. PATENT DOCUMENTS

| 5,323,289 A * | 6/1994 | Longsdorf et al. ............ 361/111 |
| 2008/0198527 A1 * | 8/2008 | Higashi et al. ................ 361/118 |

FOREIGN PATENT DOCUMENTS
DE  20 2006 006 659 U1  8/2006

OTHER PUBLICATIONS

Blitzductor® VT Lightning Current/Surge Arrester; Information Technology Systems; BVT RS485 of Dehn + Söhne GmbH & Co. KG, 2006, p. 217; English Version Enclosed.

* cited by examiner

*Primary Examiner* — Danny Nguyen
(74) *Attorney, Agent, or Firm* — Roberts Mlotkowski Safran & Cole, P.C.; Dave S. Safran

(57) ABSTRACT

An overvoltage protection device for protection of an electrical or electronic device, with a housing, with input and output terminals for electrical conductors, with line paths which each connect one input terminal to one output terminal, with first arresters which are used for symmetrical protection between the active conductors and with second arresters which are used for asymmetrical protection between the individual conductors and the ground potential, the individual first arresters each being connected by their first terminal to a line path and by their second terminal to a common connecting point so that they are at a common reference potential and symmetrical protection between two conductors is implemented by two first arresters located in series to one another. The overvoltage protection device can also be used in signal circuits with several signal conductors and can guarantee reliable protection of a connected electrical or electronic device against overvoltages.

15 Claims, 4 Drawing Sheets

OVERVOLTAGE PROTECTION DEVICE

BACKGROUND OF THE INVENTION

1. Field of Invention

The invention relates to an overvoltage protection device for protection of an electrical or electronic device, with a housing, with input and output terminals for electrical conductors, with line paths each of which connect an input terminal to an output terminal, with first arresters which are used for symmetrical protection between the active conductors and with second arresters which are used for asymmetrical protection between the individual conductors and the ground potential, the individual first arresters each being connected by their first terminal to a line path and by their second terminal to a common connecting point so that they are at a common reference potential and symmetrical protection between two conductors is implemented by two first arresters located in series to one another. In addition, the invention relates to an overvoltage protection arrangement having at least two overvoltage protection devices.

2. Description of Related Art

Interfaces in the field of measurement, control and feedback technology are far more sensitive to overvoltages than power supply systems. Sensitivity has increased to the degree to which the use of electronic components, especially transistors and thyristors in electrical devices, installation and systems has increased. Mainly, the integrated circuits used increasingly in electrical and electronic devices are greatly endangered by transient overvoltages.

Electrical circuits and electrical devices normally work without problems using the voltage specified for them, the rated voltage. This does not apply when overvoltages occur. Overvoltages are considered to be all voltages which are above the upper tolerance limit of the rated voltage. They also include mainly transient overvoltages which can occur due to atmospheric discharges, but also due to switching operations or short circuits in power supply grids, and can be metallically, inductively or capacitively coupled into electronic circuits. In order to protect electrical or electronic circuits, especially in measurement, control and feedback technology, against transient overvoltages, overvoltage protection elements have been developed which capture or limit overvoltage peaks. They are installed generally directly upstream of the signal inputs to be protected, in order to prevent the danger of overvoltage coupling on the line path between the overvoltage protection device and signal inputs of the devices.

In electrical and electronic devices, generally, the dielectric strength of the individual lines is distinctly higher relative to ground than between the individual active lines. Moreover, since the disturbances originating from the ground potential are generally of higher energy than coupled disturbances between the lines, overvoltage protection devices for protection of electrical or electronic devices often have two different types of arresters. The first arresters are used for symmetrical protection between the active conductors and the second arresters are used for asymmetrical protection between the individual conductors and the ground potential. The arresters for symmetrical protection are generally fine protection elements, especially suppressor diodes, which are characterized by short response times in the ms range and by low limiting voltages. The arresters for asymmetrical protection are conversely often gas-filled overvoltage arresters which have high discharge capacity.

These overvoltage protection devices for the field of measurement, control and feedback technology have been sold for many years by the applicant under product names "PLUGTRAB" (compare Phoenix Contact Prospectus "Overvoltage protection TRABTECH 2007, pages 60 ff). The known overvoltage protection devices are made especially as 2-channel or 4-channel devices to which two or four signal conductors can be connected so that with them symmetrical protection only between a maximum of four signal conductors can be ensured.

SUMMARY OF THE INVENTION

A primary object of this invention is to further develop the initially described overvoltage protection device such that it can also be used in signal circuits with more than four signal conductors, and in doing so, ensures reliable protection of a connected electrical or electronic device against overvoltages, especially symmetrical protection between the conductors.

This object is achieved in the initially described overvoltage protection device in that the common connecting point of the second terminals of the first arresters does not have a connection to ground and is connected to a terminal element which is accessible from outside the housing so that the terminal element of the overvoltage protection device can be connected to the terminal element of at least one other overvoltage protection device. Because, in accordance with the invention, the common connecting point of the second terminals of the first arresters which are used for symmetrical protection between the active conductors is routed out of the overvoltage protection device, it is possible to electrically connect the common connecting point by way of the terminal element with a corresponding common connecting point of one or more other overvoltage protection devices, making it possible to ensure symmetrical protection between any number of signal conductors.

Advantageously, the first arresters, which can be especially suppressor diodes, are used solely for symmetrical protection between the active conductors. Likewise, advantageously, the second arresters, which can be especially gas-filled overvoltage arresters, are used exclusively for asymmetrical protection between the individual conductors and the ground potential. By separating symmetrical fine protection between the active conductors and asymmetrical coarse protection between the individual conductor and the ground potential, the use of series impedances in the individual line paths can be eliminated.

According to one preferred configuration of the overvoltage protection device in accordance with the invention, the terminal element which is connected to the common connecting point has a plug-in contact, especially a pin or blade contact which can be plugged into a corresponding contact receiver, especially a jack. Because the terminal element has a plug-in contact, the connection to the terminal element and thus to the common connecting point of one or more other overvoltage protection devices can be easily and promptly implemented without time-consuming wiring.

The connection between the terminal elements of individual overvoltage protection devices which can each be locked onto a mounting rail can be implemented by there being a bus in the mounting rail, the bus having coupling parts which are assigned to the individual overvoltage protection devices and which each have one jack for receiving the plug-in contact of the terminal elements. The bus can consist of a plurality of coupling parts which can be mated to one another so that the bus is made modular. With respect to the specific configuration of this bus and the coupling parts, reference is made to German Utility Model DE 20 2006 006 659 U1.

According to one alternative configuration of the overvoltage protection device in accordance with the invention, the terminal element has two contacts which are connected to one another and which point in the lengthwise direction of the mounting rail, one contact being made as a blade contact and projecting on one side of the housing and the other contact being made as a corresponding contact receiver and projecting on the other side of the housing. In this configuration of the terminal element, an electrical connection between the terminal element of one overvoltage protection device and the terminal element of a second overvoltage protection device is easily possible by the two overvoltage protection devices being located adjacent to one another, especially being locked onto a mounting rail. When locked onto the mounting rail then the electrical connection between the blade contact of the terminal element of one overvoltage protection device and the corresponding contact receiver of the terminal element of the second overvoltage protection device takes place automatically by the blade contact being plugged into the contact receiver.

If several such overvoltage protection devices are arranged adjacent to one another, the individual terminal elements are each a part of a self-constructing bus via which the individual terminal elements, and thus, also the respective common connecting points of the second terminals of the first arresters of the individual overvoltage protection devices are connected to one another in an electrically conductive manner. Thus, by this configuration of the terminal elements, symmetrical protection between any number of active conductors can be implemented by electrical connection of the common reference potential of the individual first arresters of the individual overvoltage protection devices.

In addition to an individual overvoltage protection device, the invention also relates to an overvoltage protection arrangement having at least two overvoltage protection devices in accordance with the invention. With this overvoltage protection arrangement, symmetrical protection between a plurality of signal conductors can be easily implemented by the terminal element of an overvoltage protection device which is connected to the common connecting point of the second terminals of the first arresters of this overvoltage protection device being connected to the terminal element of another overvoltage protection device, also, in this overvoltage protection device, the terminal element being connected to the common connecting point of the second terminals of the first arresters. With an overvoltage protection arrangement which has, for example, three 4-channel overvoltage protection devices, symmetrical protection between a total of twelve active conductors can thus be easily ensured.

In addition to the possibility of ensuring symmetrical protection of a corresponding number of conductors among one another, the overvoltage protection arrangement in accordance with the invention, moreover, has the advantage that, by adding other overvoltage protection devices, the overvoltage protection arrangement can be easily adapted to different requirements; the overvoltage protection arrangement can thus be optionally expanded by its modular structure. By using an overvoltage protection arrangement with a corresponding number of overvoltage protection devices, thus, an electronic device, for example, a control with any number of conductors, can be easily and reliably protected against overvoltages.

According to one preferred configuration, in the overvoltage protection arrangement in accordance with the invention, electrical connection of the individual terminal elements of the individual overvoltage protection devices which are locked on a mounting rail takes place by way of a bus located in the mounting rail. For this purpose, there are several coupling parts in the mounting rail which, in the assembled state, form a common bus, the individual coupling parts each having a jack which runs perpendicular to the lengthwise direction of the mounting rail and the terminal elements of the overvoltage protection devices each having a plug-in contact, especially a pin or blade contact, which can be plugged into the corresponding jack.

In particular, there are a plurality of possibilities for embodying and developing the overvoltage protection device in accordance with the invention or the overvoltage protection arrangement. For this purpose, reference is made to the following description of preferred embodiments in conjunction with the drawings.

DETAILED DESCRIPTION OF THE INVENTION

Figure 1:
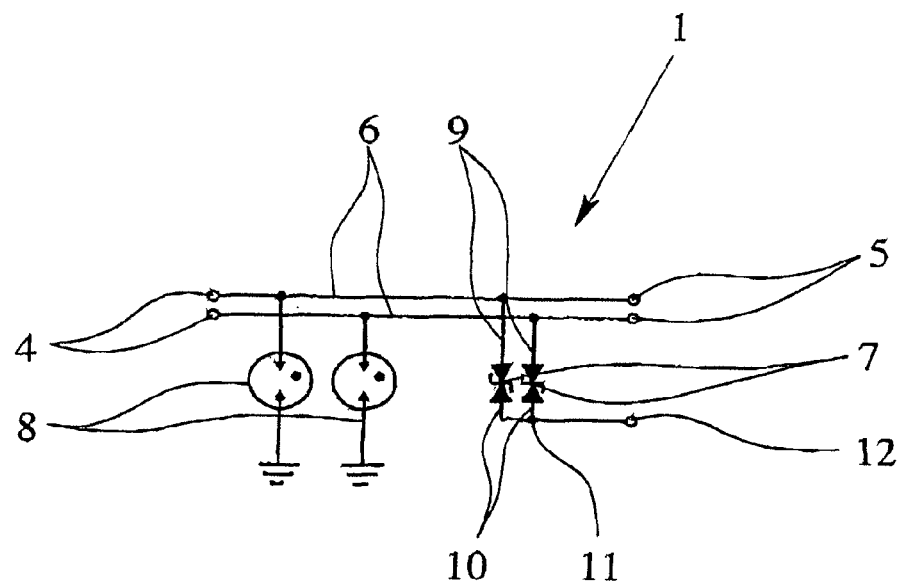
FIG. 1 is a simplified circuit diagram of a first version of an overvoltage protection device in accordance with the invention.
Figure 2:
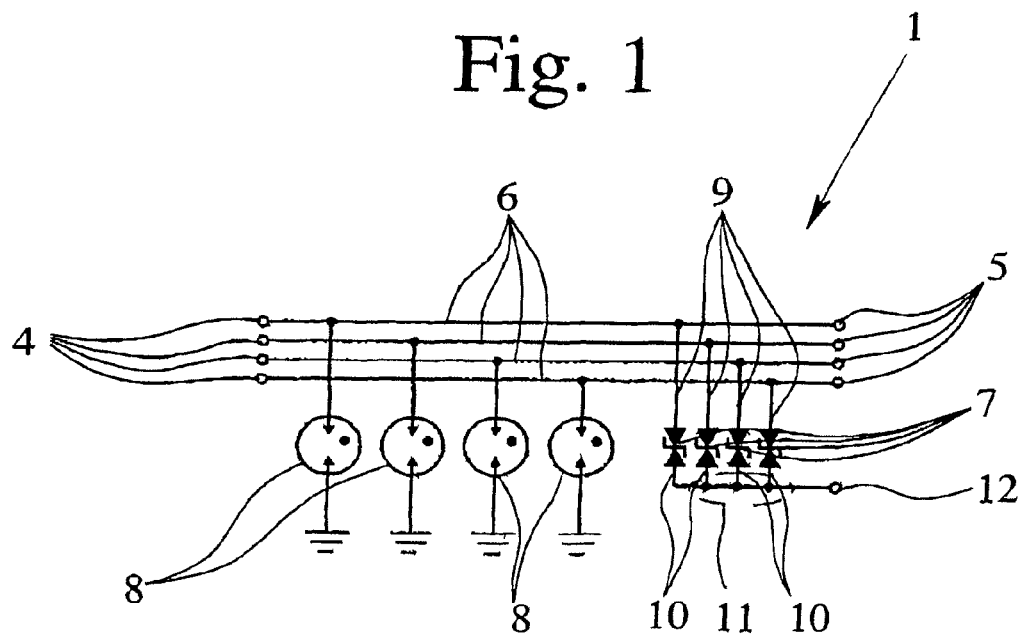
FIG. 2 is a simplified circuit diagram of a second version of an overvoltage protection device in accordance with the invention.
Figure 4:
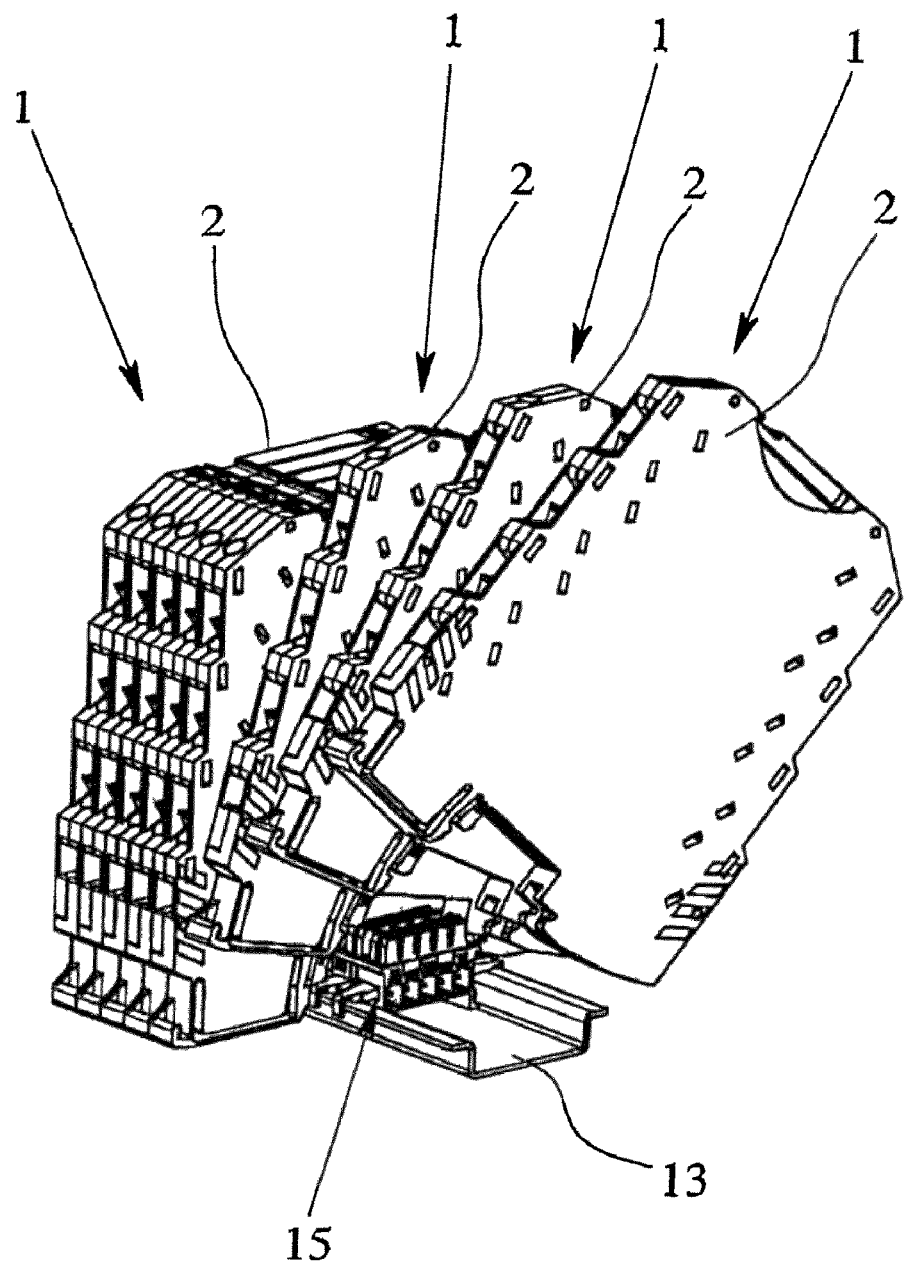
FIG. 4 shows several overvoltage protection devices, partially locked onto a mounting rail.

FIGS. 1 & 2 show the circuit structure of an overvoltage protection device 1, of which several are shown in FIG. 4. The overvoltage protection device 1 has a housing 2 which generally is formed of two housing halves, which hold a circuit board 3 located within the housing 2 with electronic components located thereon. The overvoltage protection device 1 has input terminals 4 and output terminals 5 on its two face sides which are preferably screw clamps or tension spring clamps, and the terminals 4, 5 can be located offset on top of one another or next to one another in several rows. Generally, the supply lines of a measurement, control or feedback circuit are connected to the input terminals 4, while the electronic device to be protected is connected to the output terminals 5.

As is apparent from FIGS. 1 & 2, each input terminal 4 is electrically connected to a respective output terminal 5 by way of an line path 6, FIG. 1 showing the circuit diagram of a 2-channel overvoltage protection device 1 and FIG. 2 showing the circuit diagram of a 4-channel overvoltage protection device 1. It is common to the two embodiments of the overvoltage protection device 1 which are shown in FIGS. 1 & 2 that the symmetrical protection between the active conductors is ensured by the arrangement of suppressor diodes as the first arresters 7. Moreover, the overvoltage protection devices 1 have a number of gas-filled overvoltage arresters which corresponds to the number of conductors to be connected as the second arresters 8 which are used for asymmetrical protection between the individual conductors and the ground potential. As is apparent from FIGS. 1 & 2, the first terminal 9 of the individual suppressor diodes 7 is connected to a respective line path 6 and the second terminal 10 of the individual suppressor diodes 7 to a common connecting point 11 so that the second terminals 10 of the suppressor diodes 7 are at a common reference potential. Symmetrical protection between two conductors takes place by way of two suppressor diodes 7 whose connecting point is the common connecting point 11.

Thus, symmetrical protection between only two conductors is possible solely with the overvoltage protection device 1 shown in FIG. 1, and only between four conductors solely with the overvoltage protection device 1 shown in FIG. 2. Because the overvoltage protection devices 1 in accordance with the invention have another terminal element 12 in addition to the input terminals 4 and the output terminals 5, the terminal 12 being connected to the common connecting point 11 and accessible from outside the housing 2, the terminal element 12 of one overvoltage protection device 1 can be connected to the terminal element 12 of another overvoltage protection device 1 or the terminal elements 12 of other overvoltage protection devices 1 so that there is possibility of ensuring symmetrical protection between any number of conductors.

Figure 3:
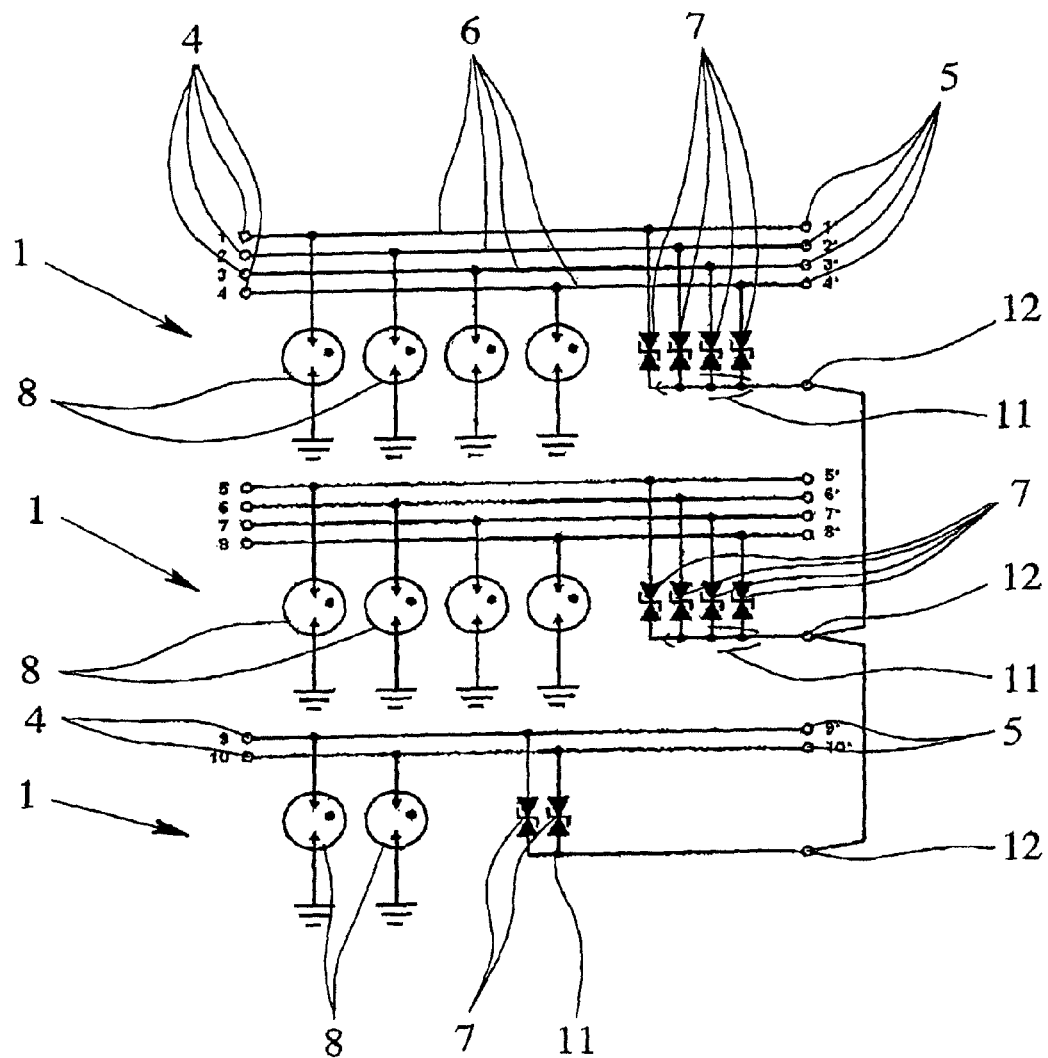
FIG. 3 is a simplified circuit diagram of an overvoltage protection arrangement having three overvoltage protection devices.

FIG. 3 shows a schematic circuit diagram of an overvoltage protection arrangement which formed of three overvoltage protection devices 1, of which two are made as 4-channel overvoltage protection devices 1 and one is made as a 2-channel overvoltage protection device 1. With this overvoltage protection arrangement, symmetrical protection between ten conductors can thus be easily implemented, for which only the terminal elements 12 of three overvoltage protection devices 1 have to be connected to one another.

Figure 5:
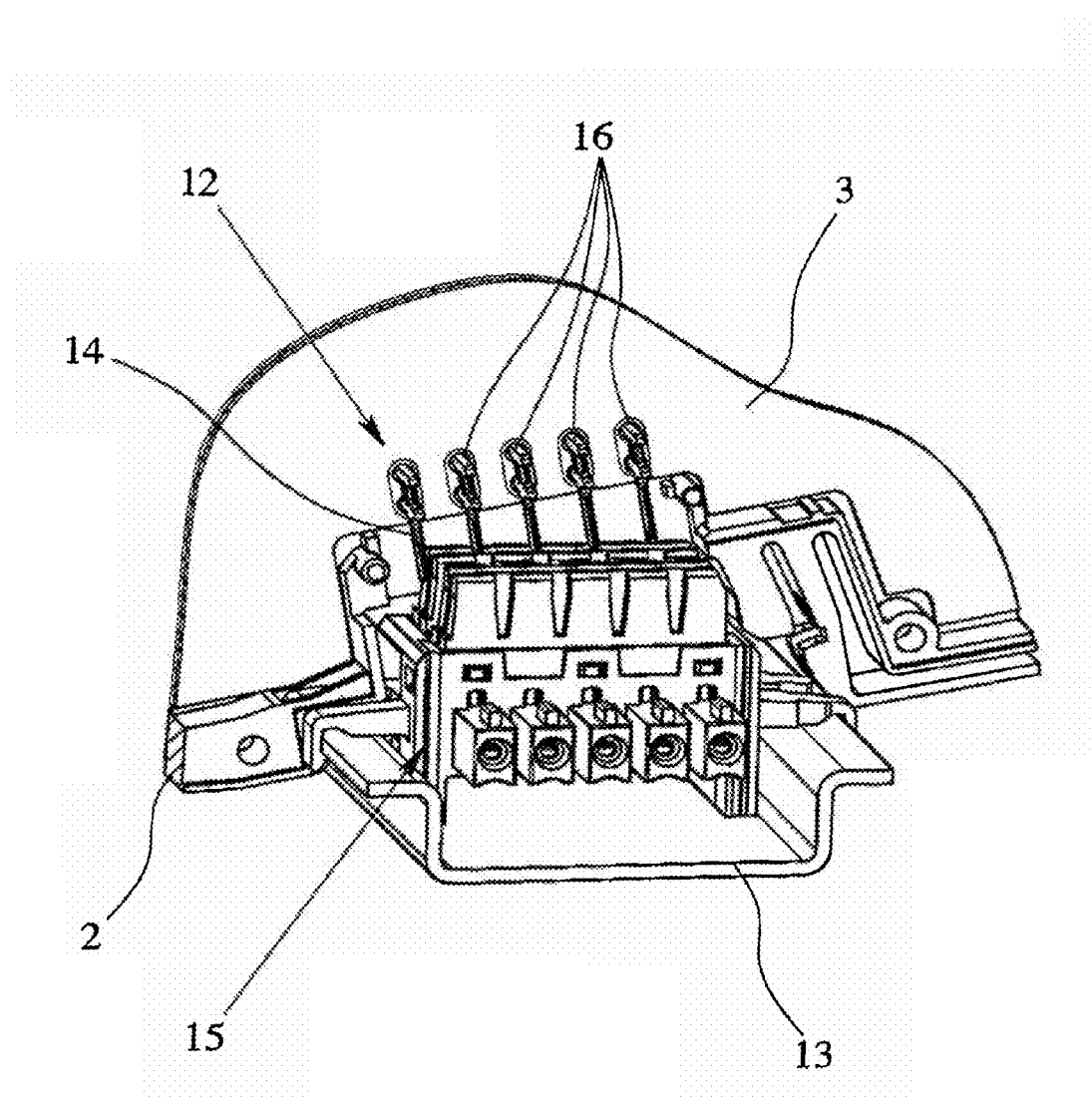
FIG. 5 shows part of the overvoltage protection device of FIG. 4 and a mounting rail with a coupling part.

FIG. 4 shows several overvoltage protection devices 1, of which some are already locked on a mounting rail 13, while other overvoltage protection devices 1 are not locked or pivoted onto the mounting rail 13. An enlarged representation of part of this overvoltage protection device is shown in FIG. 5, here only the base region of the housing 2 and the part of the circuit board 3 located in the housing 2 being shown.

For simple, especially wireless electrical contact-making, the terminal element 12 has a plug-in contact 14 which can be plugged in a corresponding jack of a coupling part 15 which is locked in the mounting rail 13. The terminal element 12 is connected to the common connecting point 11 of the second terminals 10 of the suppressor diodes 7 by way of printed conductors which are not shown here and which are made on the circuit board 3.

Besides the terminal element 12, in the circuit board 3, four other contact elements 16 are inserted and likewise electrically connected to printed conductors which likewise make contact with the corresponding jacks in the coupling part 15 when the overvoltage protection device 1 is locked onto the mounting rail 13. The coupling part 15 which is locked in the mounting rail 13 is made such that it is used not only for electrical contact-making of the terminal element 12 and of the contact elements 16, but also can be mated to adjacent coupling parts 15 which are likewise locked in the mounting rail 13 such that the coupling parts 15 which are connected to one another form a common bus for power and data transmission.

In the arrangement of a corresponding number of coupling parts 15 in the mounting rail 13, electrical connection of the terminal elements 12, and thus, of the common connecting points 11 of the second terminals 10 of the suppressor diodes 7 of the individual overvoltage protection devices 1 easily takes place in that the individual overvoltage protection devices 1 are swung onto the mounting rail 13, the plug-in contacts 14 of the terminal elements 12 being automatically inserted into the corresponding jacks in the coupling parts 15.

Moreover, a remote centralized alarm for all overvoltage protection devices 1 which have been plugged onto the coupling parts 15 can take place by way of a bus which is formed by the individual coupling parts 15. In addition, it is possible that the additional energy which may be required for status monitoring implemented in the individual overvoltage protection devices 1 is made available to the individual overvoltage protection devices 1 by way of the bus.

What is claimed is:

1. Overvoltage protection device for protection of an electrical or electronic device, comprising:
   a housing,
   input and output terminal for electrical conductors,
   line paths which connect each input terminal element to a respective output terminal element,
   first arresters for symmetrical protection between the active conductors, each first arrester having first and second terminals, and
   second arresters for asymmetrical protection between the individual conductors and the ground potential,
   wherein each first arrester is connected by the first terminal thereof to a respective one of the line paths and by the second terminal thereof to a common connecting point so that the second terminals of the second arresters are at a common reference potential and symmetrical protection between two conductors is implemented by the first arresters being located in series with one another,
   wherein the common connecting point of the second terminals of the first arresters is ungrounded and is connected to a terminal element which is accessible from outside the housing so that the terminal element of one overvoltage protection device can be connected to the terminal element of another overvoltage protection device.

2. The overvoltage protection device according to claim 1, wherein the housing is lockable onto a mounting rail.

3. The overvoltage protection device according to claim 1, wherein the terminal element has a plug-in contact which can be plugged into a corresponding contact receiver.

4. The overvoltage protection device according to claim 3, wherein the plug-in contact is a pin or blade and the contact receiver is a jack.

5. The overvoltage protection device according to claim 3, wherein the housing is lockable onto a mounting rail and wherein the plug-in contact is adapted to be plugged into a jack of a coupling part of a bus, which coupling part is located in the mounting rail.

6. The overvoltage protection device according to claim 2, wherein the terminal element has two contacts which are connected to one another and which point in a lengthwise direction of the mounting rail when locked thereon, one contact being a blade contact and projecting on one side of the housing and the other contact being a corresponding contact receiver and projecting on an opposite side of the housing.

7. The overvoltage protection device according to claim 1, wherein the first arresters are protection elements with a short response time and relatively low limiting voltage.

8. The overvoltage protection device according to claim 7, wherein the protection elements are suppressor diodes.

9. The overvoltage protection device according to claim 1, wherein the second arresters are protective elements with high discharge capacity.

10. The overvoltage protection device according to claim 9, wherein protective elements the gas-filled overvoltage arresters.

11. The overvoltage protection device according to claim 9, wherein the second arresters are protective elements with high discharge capacity.

12. The overvoltage protection device according to claim 11, wherein the first arresters are solely provide symmetrical protection between active conductors and wherein the second arresters solely provide asymmetrical protection between individual conductors and the ground potential.

13. Overvoltage protection arrangement comprising at least two overvoltage protection devices for protection of an electrical or electronic device, and a mounting rail to which each of the overvoltage protection devices is mountable,
   wherein each of the overvoltage protection devices comprises:
      a housing,
      input and output terminal for electrical conductors,
      line paths which connect each input terminal element to a respective output terminal element,
      first arresters for symmetrical protection between the active conductors, each first arrester having first and second terminals, and
      second arresters for asymmetrical protection between the individual conductors and the ground potential,
      wherein each first arrester is connected by the first terminal thereof to a respective one of the line paths and by the second terminal thereof to a common connecting point so that the second terminals of the second arresters are at a common reference potential and symmetrical protection between two conductors is implemented by the first arresters being located in series with one another, and
      wherein the common connecting point of the second terminals of the first arresters is ungrounded and is connected to a terminal element which is accessible from outside the housing so that the terminal element of one overvoltage protection device can be connected to the terminal element of another overvoltage protection device;
   wherein the terminal element of one of the overvoltage protection devices is connected to the terminal element of another of the overvoltage protection devices in an assembled state on the mounting rail.

14. The overvoltage protection arrangement in accordance with claim 13, wherein a plurality of coupling parts are provided in the mounting rail and which, in the assembled state, form a common bus, wherein each of the coupling parts has a jack which runs perpendicular to a lengthwise direction of the mounting rail and wherein each of the terminal elements of the overvoltage protection devices has a plug-in contact that is configured for being plugged into a respective jack.

15. The overvoltage protection arrangement according to claim 14, wherein each terminal element has two contacts which are connected to one another and which point in the lengthwise direction of the mounting rail when locked thereon, one contact being a blade contact and projecting on one side of the housing and the other contact being a corresponding contact receiver and projecting on an opposite side of the housing.

* * * * *